United States Patent [19]

Calis et al.

[11] Patent Number: 4,569,677

[45] Date of Patent: Feb. 11, 1986

[54] PROCESS FOR SEPARATING OFF CALCIUM NITRATE TETRAHYDRATE BY CRYSTALLIZATION

[75] Inventors: Gijsbertus H. M. Calis, Hulsberg; Matheus H. G. Jennekens, Born, both of Netherlands

[73] Assignee: Unie van Kunstmestfabrieken B.V., Utrecht, Netherlands

[21] Appl. No.: 583,039

[22] Filed: Feb. 23, 1984

[30] Foreign Application Priority Data

Mar. 7, 1983 [NL] Netherlands .......................... 8300816

[51] Int. Cl.$^4$ ............................................... B01D 9/02
[52] U.S. Cl. ......................................... 23/301; 23/304
[58] Field of Search ................. 23/301, 304, 296, 298, 23/299; 423/161, 162, 167, 319, 395

[56] References Cited

U.S. PATENT DOCUMENTS

| | | | |
|---|---|---|---|
| 1,976,283 | 10/1934 | Johnson et al. | 423/319 |
| 2,573,516 | 10/1951 | vom der Molen | 23/299 |
| 2,813,777 | 11/1957 | Swensen | 23/301 R |
| 4,008,309 | 2/1977 | Moldovan et al. | 423/167 |

FOREIGN PATENT DOCUMENTS 1149310 4/1969 United Kingdom .

OTHER PUBLICATIONS

92 Chem. Abst. No. 23, p. 584, No. 197171k (Jun. 1980).

*Primary Examiner*—Hiram H. Bernstein
*Attorney, Agent, or Firm*—Cushman, Darby & Cushman

[57] ABSTRACT

Separating $Ca(NO_3)_2.4H_2O$ from a nitrophosphate digestion liquor by crystallization, wherein $Ca(NO_3)_2.4H_2O$ seeding material with a particle size smaller than 100 μm is added to this liquor at a temperature of 0°, 1°–2° C. lower than the saturation temperature, the resulting liquor is batchwise cooled, and the $Ca(NO_3)_2.4H_2O$ crystallized out is separated from the cooled liquor.

The $Ca(NO_3)_2.4H_2O$ is substantially crystallized out without excessive cooling as very coarse and uniform particles which can be easily separated out.

8 Claims, No Drawings

PROCESS FOR SEPARATING OFF CALCIUM NITRATE TETRAHYDRATE BY CRYSTALLIZATION

BACKGROUND OF THE INVENTION

The invention relates to a process for separating calcium nitrate tetrahydrate by crystallization from a liquor obtained by digesting phosphate rock with nitric acid.

Such a process is common knowledge and constitutes an essential part of the so-called Odda nitrophosphate process (see for instance British Patent No. 339,340). In this known process the calcium nitrate formed in the digestion is continuously separated off by crystallization as tetrahydrate by cooling the digestion liquor by means of a cold cooling liquid and separating the crystallized salt from the mother liquor, which is processed, to form a mixed fertilizer. Depending on the final temperature of the cooled digestion liquor, about 60-90% of the calcium nitrate present in the digestion liquor will crystallize out in said process.

A disadvantage of this known process is that the crystals formed are very nonhomogeneous in terms of particle size and, moreover, have a relatively small average particle diameter. Consequently, it is very difficult indeed for the crystals to be separated off. For instance in the separation of the crystals from the mother liquor by centrifugation or filtration frequently results in a substantial slip-through of crystals. The substantial-slip through of crystals is disadvantageous because during subsequent processing of the mother liquor into mixed fertilizer products water-insoluble and sometimes citrate-insoluble phosphates are formed. The formation of such insoluble materials results in a loss of available nutrient phosphate.

It is true that a larger quantity of calcium nitrate in the digestion liquor may be crystallized by cooling the latter to very low temperatures as described in, for instance, Proces Techniek, dated 2.5.1969, pages 312-316. The disadvantage of this process is that the cooling to very low temperatures requires a large amount of energy and a very high cooling capacity. Moreover, it has been found that, in this process, too, the calcium nitrate crystals formed have a rather small and inhomogeneous particle size, so that in the separation of these there will be a certain degree of slip-through of these crystals. The two processes described above consequently require substantial investments, either for effectively separating off the crystals or for extra cooling capacity, in order to obtain a mother liquor having a sufficiently low calcium nitrate concentration. These known processes, moreover, have the disadvantage that during the process the calcium nitrate tetrahydrate formed on the cooling surfaces must be removed. This involves an extra increase in the amount of cooling energy required.

U.S. Pat. No. 2,813,777 discloses a batchwise process for crystallizing out calcium nitrate from nitric acid digestion liquors. In this process the calcium nitrate crystallizes out mainly in the form of relatively coarse crystals (0.5-1.0 mm), after which these crystals can be separated off from the mother liquor by filtration. This is achieved by adding calcium nitrate-containing seed material to a digestion liquor having a temperature 2°-10° C. lower than the saturation temperature and by further cooling the liquor obtained. In this process the crystals obtained show a fairly wide particle size distribution. Although the crystals can largely be separated off through filtration, it has been found that, long filtration times are necessary because of the non-homogeneous particle sizes, i.e., the wide particle size distribution. In this process, too, there will be a growth of fine calcium nitrate tetrahydrate material on the cooling surfaces.

SUMMARY OF THE INVENTION

The invention now provides a process in which it is possible, without excessive cooling, for the calcium nitrate to be crystallized out in batches from a nitric acid digestion liquor substantially in the form of very coarse and very uniform calcium nitrate tetrahydrate crystals that can practically quantitatively be separated off from the liquor, and in which process there will no longer be any growth of crystals on the cooling surfaces.

The invention therefore relates to a process for separating calcium nitrate tetrahydrate by crystallization from a liquor obtained by digesting phosphate rock with nitric acid, during batchwise cooling of the liquor, which process comprises adding in the beginning of the cooling process calcium nitrate tetrahydrate seed material with a particle size smaller than 100 $\mu$m in a quantity of 50,000-200,000 seed crystals per kg digestion liquor to the digestion liquor at a temperature of the digestion liquor which is 0.1°-2° C. lower than the saturation temperature of the digestion liquor, cooling the digestion liquor subsequently further by means of a cooling medium, and separating the calcium nitrate tetrahydrate crystallized out in this process from the cooled digestion liquor.

DETAILED DESCRIPTION OF THE PREFERRED EMBODIMENTS

It has been found that—irrespective of the exact size of the seed material—seed crystals must be added, in a quantity of about 50,000 to 200,000 per kg digestion liquor to be cooled in order to achieve satisfactory crystallization during cooling. If a smaller quantity of seed crystals is used, it will be found that during cooling a substantial quantity of fine product crystals are formed, in addition to relatively coarse product crystals, whereas, if a larger quantity of seed crystals is used, the average diameter of the product crystals will decrease strongly. The seed material that can be used includes fine calcium nitrate tetrahydrate obtained by grinding coarser calcium nitrate tetrahydrate particles, for instance granules, grains, prills, crystals, and screening out a fraction having a particle size smaller than 100 $\mu$m. The grinding, however, requires relatively much energy.

Therefore advantageously in the present process use is made of seed material consisting of fine nuclei obtained by adding a calcium nitrate-containing material to a quantity of supercooled calcium nitrate-containing digestion liquor. In this process there will momentarily be a spontaneous formation of very fine nuclei. The size of these nuclei is determined mainly by the degree to which the liquor is supercooled. It has been found that very fine and practically uniform nuclei having a particle size of between 25 and 30 $\mu$m are obtained if a supercooled digestion liquor having a temperature of 18° to 22° C., particularly about 20° C., is started from. The calcium nitrate-containing material added to the supercooled digestion liquor may be, for instance, broken or unbroken calcium nitrate crystals. A small quantity of calcium nitrate-containing suspension having a temperature of, for instance, 5° C. or lower can be added also. Such a suspension is obtained in the present process at the end of the crystallization process.

It is in principle possible for the fine nuclei thus formed to be separated off from the supercooled liquor and for these nuclei separated off to be used as seed material. As this separation of such very small nuclei is however quite laborious, advantageously the nuclei-containing supercooled liquor is used as seed material. A quantity of about 0.05 to 0.2 ml of the nuclei-containing supercooled liquor per kg digestion liquor to be cooled will suffice to effect satisfactory crystallization.

An essential feature of the present process is the temperature of the digestion liquor at which the seed material is added. In order to obtain an optimum crystallization effect, the chosen temperature must be below and as close as possible to the saturation temperature of the digestion liquor to be cooled. If the seed material is added to a liquor having a lower temperature, it will be found that product crystals are obtained having a very wide crystal size distribution. Particularly the seed material is added to a digestion liquor having a temperature 0.2°-1.0° C. lower than the saturation temperature.

In the present process the seeded digestion liquor is further cooled by means of a cooling medium, especially a liquid cooling medium, such as methanol, an aqueous ammoniacal solution or aqueous solutions of inorganic salts, e.g. calcium nitrate, whereas the cooling is effected by indirect contact between cooling medium and digestion liquor to be cooled.

It has been found that the method of cooling is important for obtaining product crystals having large and uniform particle dimensions.

According to one mode of realization, the cooling is effected in a plurality of cooling steps, while using, in each step, a cooling medium having a constant temperature, which is lower than the temperature of the cooling medium in the preceding step.

According to a preferred mode of realization, the temperature of the cooling medium in the crystallization system is lowered continuously. In principle such a continuous decrease in temperature can be achieved in several ways. An advantageous method is to use cooling media from a number of cooling systems each operating within a different temperature range, and wherein the mixing ratio of said cooling media is carefully adjusted, e.g. with the aid of a microprocessor based control system.

The advantage of this mode of realization is that the maximum permissible difference in temperature between the cooling medium and the digestion liquor to be cooled, given by the difference between the nucleation temperature (see below) and the saturation temperature of the digestion liquor to be cooled, is used throughout the cooling process. This causes the crystallization process to proceed more rapidly so that a substantial capacity increase is effected.

A further advantage of the use of cooling medium from a number of cooling systems is that use can be made from the ultimately resulting cold mother liquor to lower by indirect heat exchange the temperature of the cooling medium used in the first traject of the crystallization. Furthermore in such a cooling system advantageously use can be made of cooling water to cool or precool by indirect heat exchange the cooling medium used in said first traject.

It has further been found that the difference in temperature between the cooling medium and the digestion liquor to be cooled is very important for obtaining proper product crystals. If at any moment the chosen difference in temperature between cooling medium and digestion liquor to be cooled is too great, a drastic increase of small product crystals will be found to occur. This is due to the formation of new nuclei of calcium nitrate tetrahydrate—in addition to or instead of a growth of calcium nitrate tetrahydrate crystallizing out on the seed crystals present. As a result the average size of the product crystals decreases and, moreover, a great many product crystals of very small size are formed. Consequently, the particle size distribution is considerable. It is important, therefore, in the present process to take care that throughout the whole cooling process a cooling medium is used having a temperature that does not permit of the spontaneous formation of calcium nitrate tetrahydrate nuclei in the digestion liquor to be cooled, which, at the same time, prevents the growth of crystals on the cooling surfaces so that the transfer of heat is not adversely affected.

An extra advantage of this method of cooling is that a substantial saving on the cooling energy requirements is achieved, because the temperature to which large part of the cooling liquid to be used has to be cooled may be less low, which allows the cooling equipment to function with greater efficiency.

According to one mode of realization this can be achieved by using, throughout the cooling process, a cooling medium having a temperature higher than the nucleation temperature of the digestion liquor to be cooled.

Nucleation temperature is understood to mean in this connection the temperature at which in a crystalline calcium nitrate tetrahydrate-containing saturated solution the supersaturation that occurs during the cooling of this solution is removed completely by the formation of nuclei and the growth of crystals. This temperature can be determined by fixing visually or through accurate temperature measurement the nucleation point as a function of the concentration of the substance to be crystallized out as described, for instance, in 'Crystal Growth' by B. R. Pamplin, Pergamon Press (1975) page 294.

If the concentration of crystals in the digestion liquor is higher than about 20%, it will be found that there will be no perceptible spontaneous formation of calcium nitrate tetrahydrate nuclei in the liquor during cooling, not even when a cooling medium is used having a temperature lower than the nucleation temperature of the liquor to be cooled. Apparently the total crystal surface available has then become so large that the supersaturation is eliminated completely by the growth on crystals already present in the suspension. According to a preferred mode of realization the cooling is therefore effected in such a manner that, as long as the concentration of crystals in the digestion liquor is lower than about 20%, a cooling medium is used having a temperature higher than the nucleation temperature of the digestion liquor to be cooled with the cooling medium and, if the concentration of crystals in the digestion liquor is higher than about 20%, a cooling medium is used having a temperature substantially lower than the nucleation temperature of the digestion liquor to be cooled with the cooling medium.

The advantage of this last-mentioned variant is that the cooling effected in the final phase of the cooling process can be more rapid, so that a saving on crystallizer volume is realized. As long as the concentration of crystals in the digestion liquor is lower than about 20%, preference is given to using a cooling medium having a temperature 2°–6° C. lower than the saturation temperature of the digestion liquor to be cooled, and if the concentration of crystals in the digestion liquor is higher than about 20%, preference is given to using a cooling medium having a temperature 5°–15° C. lower than the saturation temperature of the digestion liquor to be cooled.

In the present invention the calcium nitrate tetrahydrate crystallizes out in the form of crystals having a particularly great uniformity in terms of particle size, viz. a distribution of about 5–10%. In principle crystals of any desired size can be made. In the process according to the invention crystals will be produced having an average particle size of between 1000 and 1500 μm. These crystals can be separated from the mother liquor in a fairly simple manner and virtually quantitatively, e.g. by filtration.

The process described for crystallizing out calcium nitrate tetrahydrate can in principle be applied to any liquor obtained by digesting phosphate rock with nitric acid. The highly corrosive inert components present in such a digestion liquor can be removed partly if so desired prior to the crystallization of calcium nitrate, for instance by means of a hydrocyclone. Such a separation of inert is necessary if the calcium nitrate crystallized out is separated off by means of a centrifuge. If, however, the crystallization is effected according to the present process, in which process the crystals may be separated off through filtration, the prior removal of inert is not necessary from an erosion point of view, because this method of separation is hardly sensitive to erosion.

The calcium nitrate tetrahydrate separated off in the present process can be further treated as known in the art, for instance be washed with cold nitric acid to remove entrained mother liquor, which can be added to the mother liquor already separated off, and subsequently be rewashed with water. The nitric acid washing liquid can then be returned advantageously to the digestion. The water-containing calcium nitrate thus purified can be converted in a manner also known in the art into calcium carbonate and ammonium nitrate.

The mother liquor of phosphoric acid and possibly nitric acid remaining after separating off the calcium nitrate tetrahydrate crystallized out still contains a quantity of calcium, depending on the final temperature of the cooling. It has been found that, in applying the present process, cooling to for instance +5° C. will produce a mother liquor having a sufficiently low molar $CaO:P_2O_5$ ratio for the preparation of mixed fertilizers with at least 80% water-soluble $P_2O_5$.

The invention will be further elucidated in the following examples without, however, being limited thereto.

EXAMPLE I

Jordan phosphate with a CaO content of 50.8% (wt) and a $P_2O_5$ content of 32.5% (wt) was digested at a temperature of 65° C. with 60% (wt) $HNO_3$ in a quantity of 2 parts by weight $HNO_3$ solution per part by weight phosphate rock. The resulting digestion liquor ($CaO:P_2O_5$ molar ratio of 3.95) was mixed with a quantity of cold digestion liquor with a lower $CaO:P_2O_5$ ratio obtained in a later stage of the process, which resulted in a mixture having a temperature of about 40° C. and a $CaO:P_2O_5$ molar ratio of 2.75. This mixture (saturation temperature 26.5° C.) was fed into a 2.5-litre crystallizer provided with cooling coils and cooled there in a first cooling step by means of methanol (temperature 24° C.) for about 30 minutes. During the cooling, at a temperature of 26.1° C., calcium nitrate tetrahydrate seed crystals with an average diameter of about 60 μm were added to the mixture in a quantity of 25 mg per kg digestion liquor (65,000 crystals/kg digestion liquor). These crystals had been obtained by grinding and screening coarse calcium nitrate tetrahydrate crystals.

In a second cooling step the resulting mixture was cooled in the crystallizer for about 50 minutes with methanol (temperature 21.6° C.), subsequently in a third cooling step for about 50 minutes with methanol (temperature 11.8° C.) and finally in a fourth cooling step for about 50 minutes with methanol (temperature −0.3° C.).

The resulting suspension (temperature 2.1° C.) was filtered, producing as filtrate a mother liquor with a $CaO:P_2O_5$ molar ratio of 0.75 and as filter cake calcium nitrate tetrahydrate crystals having a particle size between 1300 en 1400 μm.

EXAMPLE II

The process of example I was repeated on the understanding that the seed material added was a nuclei-containing suspension in a quantity of 0.1 ml per kg digestion liquor. This suspension had been obtained by cooling part of the digestion liquor obtained in example I to 20° C. and adding to this a few calcium nitrate tetrahydrate crystals.

The results were the same as those of example I.

EXAMPLE III

The process of example II was repeated on the understanding that the nuclei-containing suspension had been obtained by adding to the digestion liquor cooled to 20° C. a small quantity of cold calcium nitrate suspension obtained in the fourth cooling step of example I.

The results were the same as those of examples I and II.

EXAMPLE IV

The process of example III was repeated on the understanding that 0.2 ml nuclei-containing suspension per kg digestion liquor was added.

The resulting $Ca(NO_3)_2.4 H_2O$ crystals had a particle size between 1050 and 1150 μm.

EXAMPLE V

The process of example III was repeated on the understanding that 0.05 ml nuclei-containing suspension per kg digestion liquor was added.

The resulting $Ca(NO_3)_2.4 H_2O$ crystals had a particle size between 1400 and 1500 μm.

COMPARATIVE EXAMPLE A

The process of example I was repeated, in which process calcium nitrate tetrahydrate crystals with an average diameter of 64 μm were added to the digestion liquor ($CaO:P_2O_5$ molar ratio 2.75) at a temperature of 26.1° C. in a quantity of 750 mg per kg digestion liquor and the mixture was cooled in the first cooling step for 35 minutes with methanol (23.7° C.), in the second step for 40 minutes with methanol (22.0° C.), in the third step for 60 minutes with methanol (11.9° C.) and in the fourth step for 60 minutes with methanol (−2.0° C.).

The resulting suspension (0.5° C.) was filtered, producing as filtrate a mother liquor with a CaO:P$_2$O$_5$ molar ratio of 0.68 and as filter cake Ca(NO$_3$)$_2$.4 H$_2$O crystals having a particle size between 600 and 700 μm.

EXAMPLE VI

In the same way as in example I Jordan phosphate was digested with 60% (wt) HNO$_3$ and the resulting digestion liquor mixed with a cold digestion liquor with a lower CaO:P$_2$O$_5$ molar ratio, producing a mixture having a temperature of about 42° C. and a CaO:P$_2$O$_5$ molar ratio of 3.25.

This mixture (saturation temperature 28.5° C.) was cooled in a first step for 30 minutes with methanol (26.2° C.) a quantity of 30 mg seed crystals with an average diameter of 64 μm being added per kg liquor at a temperature of 28.0° C.

The mixture was cooled in a second step for about 60 minutes with methanol (23.2° C.), subsequently in a third step for about 50 minutes with methanol (12.5° C.), and in a fourth step for about 40 minutes with methanol (−2.0° C.).

The resulting suspension (temperature 0.0° C.) was filtered, producing a mother liquor having a CaO:P$_2$O$_5$ molar ratio of 0.72 and Ca(NO$_3$)$_2$.4 H$_2$O crystals having a particle size between 1200 and 1300 μm.

COMPARATIVE EXAMPLE B

The process of example VI was repeated on the understanding that the liquor was cooled in the second cooling step (nucleation temperature about 23° C.) for about 70 minutes with methanol of 22.5° C. In this process nucleation occurred in this second step.

The resulting Ca(NO$_3$)$_2$.4 H$_2$O crystals consequently had a particle size between 700 and 1100 μm.

EXAMPLE VII

In the same way as in example I Kola phosphate (CaO content 52.0% (wt); P$_2$O$_5$ content 38.4 % (wt)) was digested with 60% (wt) HNO$_3$, resulting in a digestion liquor with a CaO:P$_2$O$_5$ molar ratio of 3.36 (saturation temperature 29.3° C.).

This liquor was cooled in a first step for about 45 minutes with methanol (27° C.), in which process 25 mg Ca(NO$_3$)$_2$.4 H$_2$O seed crystals (d$_{50}$:64μ) per kg digestion liquor was added to the liquor at a temperature of 28.9° C.

The mixture was cooled in a second step for 80 minutes with methanol (22° C.), subsequently in a third step for 80 minutes with methanol (12°) and finally in a fourth step for 60 minutes with methanol (−1.0° C.).

The resulting suspension (temperature 2.2° C.) was filtered, producing on the one side a mother liquor with a CaO:P$_2$O$_5$ molar ratio of 0.40 and on the other Ca(NO$_3$)$_2$.4 H$_2$O crystals with a particle size of 1300–1400 μm.

EXAMPLE VIII

The process of example VII was repeated on the understanding that a nuclei-containing suspension was added to the digestion liquor at 28.9° C. in a quantity of 0.09 ml per kg digestion liquor. This suspension had been obtained by cooling part of the digestion liquor to 19.5° C. and adding to it a small quantity of cold crystallizer slurry obtained in the fourth cooling step of example VII.

The results were the same as those of example VII.

EXAMPLE IX

In the same way as in example I Youssoufia phosphate (50.8% (wt) CaO and 31.2% (wt) P$_2$O$_5$) was digested with HNO$_3$, resulting in a digestion liquor with a CaO:P$_2$O$_5$ molar ratio of 3.95 and a saturation temperature of 30.4° C.

This digestion liquor was cooled with methanol in four steps with a cooling time of 60 minutes per step, using in the first step methanol with a temperature of 25.4° C., in the second step 17.8° C., in the third step 10.4° C. and in the fourth step 0.0° C. In the first step 25 mg Ca(NO$_3$)$_2$.4 H$_2$O seed crystals (d$_{50}$:64 μm) per kg liquor was added to the liquor at a temperature of 29.9° C.

The suspension (temperature about 5° C.) resulting after the fourth step was filtered, producing a mother liquor with a CaO:P$_2$O$_5$ molar ratio of 0.73 and Ca(NO$_3$)$_2$.4 H$_2$O crystals with a particle size between 1300 and 1400 μm.

COMPARATIVE EXAMPLE C

The process of example IX was repeated on the understanding that the digestion liquor was cooled with methanol in three steps, and that in the first step for about 90 minutes with methanol with a temperature of 25.4° C., in the second step for about 100 minutes with methanol of 17.8° C. and in the third step for about 70 minutes with methanol of 0° C.

After filtration of the resulting suspension (5.0° C.), again a mother liquor with a CaO:P$_2$O$_5$ molar ratio of 0.73 was obtained. The resulting filter cake consisted of Ca(NO$_3$)$_2$.4 H$_2$O crystals having substantially a particle size between 1100 and 1200 μm, in addition to a small fraction of crystals is having a particle size between 100 and 200 μm.

This shows that in consequence of the forced cooling in the third step Ca(NO$_3$)$_2$.4 H$_2$O nuclei were formed.

EXAMPLE X

In the same way as in example I Jordan phosphate was digested with HNO$_3$ and the resulting digestion liquor mixed with a quantity of cold digestion liquor with a lower CaO:P$_2$O$_5$ molar ratio, producing a mixture with a temperature of about 40° C. and a CaO:P$_2$O$_5$ molar ratio of 2.75.

This mixture was cooled in a crystallizer for 15 minutes, using methanol with a temperature of 24.0° C., a quantity of 25 mg seed crystals (d$_{50}$:64 μm) per kg mixture being added during the cooling at a temperature of 26.1° C.

The mixture was subsequently cooled with methanol, in which process the temperature of the methanol was lowered continuously, and that for 20 minutes by 4° C. per hour, subsequently for 20 minutes by 8° C. per hour and finally for 90 minutes by 20° C. per hour.

The eventually resulting suspension (2.2° C.) was filtered, producing a mother liquor with a CaO:P$_2$O$_5$ molar ratio of 0.73 and Ca(NO$_3$)$_2$.4 H$_2$O crystals with a particle size between 1300 and 1400 μm.

What we claim is:

1. A process for separating calcium nitrate tetrahydrate by crystallization during batchwise cooling from a digestion liquor obtained by digesting phosphate rock with nitric acid, which process comprises;

initially cooling the digestion liquor using a cooling medium having a temperature higher than the nucleation temperature of the digestion liquor and adding about 50,000 to 200,000 calcium nitrate tetrahydrate seeds per kg of the digestion liquor to be cooled to the digestion liquor, said seeds having a particle size less than 100 μm wherein the temperature of the digestion liquor is between 0.1° C. and 2° C. below the saturation temperature of the digestion liquor whereby calcium nitrate tetrahydrate crystals grow from said seeds, the initial cooling continuing as long as the concentration of calcium nitrate tetrahydrate crystals in the digestion liquor is less than about 20%, thereafter, when the concentration of said crystals in the digestion liquor has increased to above about 20%, subsequently cooling the digestion liquor using a cooling medium having a temperature lower than the nucleation temperature of the digestion liquor; and separating out the calcium nitrate tetrahydrate crystallized out in this process from the thus-cooled digestion liquor.

2. The process according to claim 1 wherein the seeds consist of fine nuclei obtained by adding a solid calcium nitrate-containing material to a supercooled calcium nitrate-containing digestion liquor.

3. The process according to claim 2, wherein the solid calcium nitrate-containing material is added to a digestion liquor supercooled to a temperature of 18°-22° C. and the resulting liquor, containing nuclei having a particle size of 25-30 μm, is used as seed material in a quantity of 0.05-0.2 ml of the nuclei-containing digestion liquor per kg digestion liquor to be cooled.

4. The process according to claim 1, wherein the seeds are added to the digestion liquor to be cooled at a temperature 0.2°-1.0° C. lower than the saturation temperature of the digestion liquor.

5. The process according to claim 1, wherein the cooling is effected in a plurality of cooling steps and in each step a cooling medium is used having a constant temperature, the temperature of the cooling medium in a given step being lower than the temperature of the cooling medium in the preceding step.

6. The process according to claim 1, wherein the temperature of the cooling medium used is lowered continuously.

7. The process according to claim 6 wherein use is made of cooling media from a number of cooling systems each of which operates within a different temperature range, and said continuous decrease in temperature is effected by adjusting the mixing ratio of said cooling media.

8. The process according to claim 1 wherein as long as the concentration of calcium nitrate tetrahydrate crystals in the digestion liquor is less than about 20%, the cooling is effected with a cooling medium having a temperature which is 2°-6° C. lower than the saturation temperature of the digestion liquor to be cooled and, when the concentration of said crystals in the digestion liquor has increased to above about 20%, the cooling is subsequently effected with a cooling medium having a temperature which is 5°-15° C. lower than the saturation temperature of the digestion liquor to be cooled.

* * * * *